(No Model.)
W. E. HEDGER.
TUBULAR COUPLING.
No. 547,073.  Patented Oct. 1, 1895.
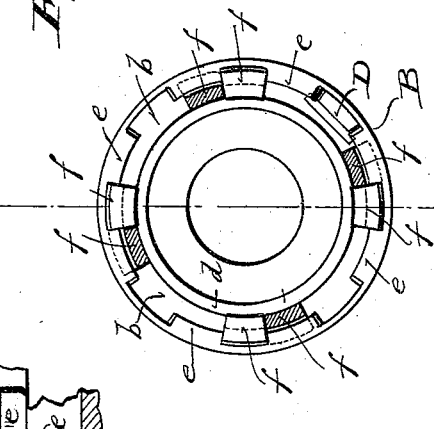
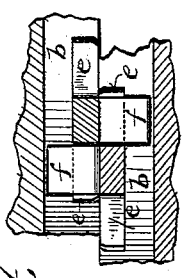
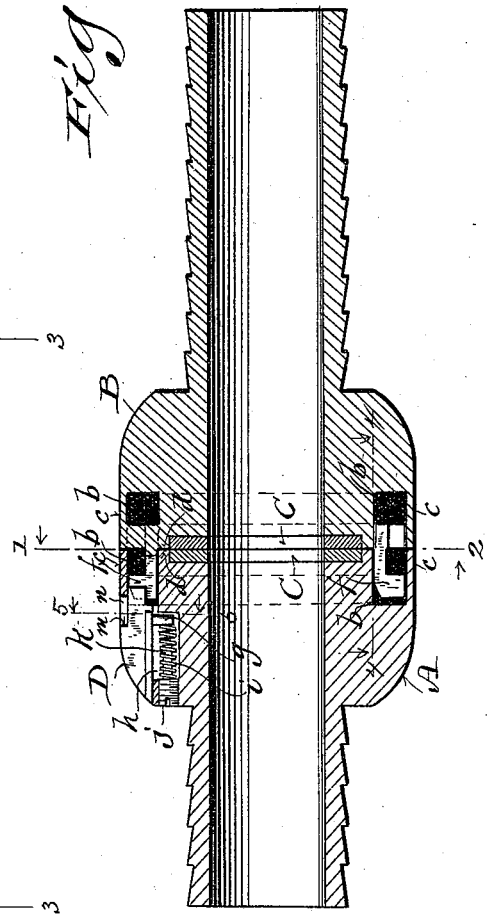
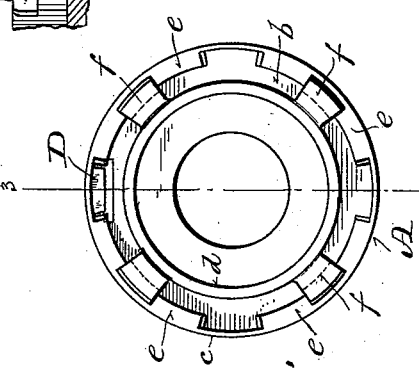
Witnesses:
Geo. W. Young,
N. E. Oliphant
Inventor
Ward E. Hedger
By H. G. Underwood
C. Korwey

UNITED STATES PATENT OFFICE.

WARD E. HEDGER, OF MILWAUKEE, WISCONSIN.

TUBULAR COUPLING.

SPECIFICATION forming part of Letters Patent No. 547,073, dated October 1, 1895.

Application filed December 8, 1894. Serial No. 531,188. (No model.)

*To all whom it may concern:*

Be it known that I, WARD E. HEDGER, a citizen of the United States, and a resident of Milwaukee, in the county of Milwaukee and State of Wisconsin, have invented certain new and useful Improvements in Tubular Couplings; and I do hereby declare that the following is a full, clear, and exact description thereof.

My invention has for its object to provide a simple, economical, and efficient tubular coupling; and it consists in certain peculiarities of construction and combination of parts hereinafter set forth with reference to the accompanying drawings and subsequently claimed.

In the drawings, Figure 1 represents a plan of one section of my improved coupling as viewed on line 1 2 of Fig. 3; Fig. 2, a sectional view on line 2 1 of the succeeding figure; Fig. 3, a longitudinal transverse section of said coupling; Fig. 4, a detail sectional view on line 4 4 of the preceding figure, and Fig. 5 a similar view on line 5 5 of Fig. 3.

Referring by letter to the drawings, A B represent the two sections of a hose-coupling embodying my improvements, each section being shown provided with a shank having a succession of annular shoulders, as is the usual practice in that class of couplings joined to hose by wiring; but instead of these shanks I may construct the coupling-sections for screw-thread engagement with hose or other tubular conveyers, as is also common practice.

According to my invention each section of the coupling is provided with an annular space $b$ between parallel walls $c$ $d$, the inner wall being also the boundary for a seat in which a compressible gasket C is arranged. On either of the walls $c$ $d$ are lugs $e$, that extend about half-way across the space $b$, and projecting from each coupling-section are hooks $f$, that pass extremities of the lugs of the opposing section and are turned under these lugs to complete the coupling, the opposing gaskets being compressed to make a fluid-tight joint.

I have shown the lugs $e$ of each coupling-section on the outer wall $c$, bounding the space $b$; but, as above intimated, said lugs may be on the opposite wall $c$, if found more convenient or desirable. I have also shown each hook $f$ midway of a lug $e$ in the coupling-section to which it belongs, and as a result of this construction and arrangement of parts either coupling-section may be turned to the right or left to complete the coupling after the hooks of one section have entered the space in the other.

In any form of my invention I employ a stop in connection with each coupling-section, this stop being designed to come in the rotary path of a hook on the opposing section after a union is effected, whereby this union is maintained. Various stops, spring-controlled or otherwise, may be employed; but the one herein shown is perhaps the most preferable, and it consists of a transversely-shouldered plate D, that has dovetail connection with its relative coupling-section. This plate is provided with a lateral lug $g$, that works in a longitudinal recess $h$ in the coupling-section, and a spiral spring $i$ is arranged in the recess intermediate of said lug and a screw-plug $j$, as shown in Fig. 3. To prevent undue compression of the spring a buffer $k$ is arranged therein, this buffer serving to limit outward movement of the stop.

The stops herein shown and any spring-controlled stops that may be employed are arranged to yield to pressure of opposing hooks $f$ when the coupling-sections are joined, and upon a rotation of either of these sections, to complete the coupling, said stops automatically return to their normal position and are thereby in the rotary path of said hooks to maintain said coupling. The transverse shoulders $m$ of the stops and adjacent recesses $n$ in the coupling-sections permit of said stops being retracted by a thumb-nail of the operator or a suitable tool.

Having thus described my invention, what I claim as new, and desire to secure by Letters Patent, is—

1. A tubular-coupling comprising two sections each of which is provided with an open annular space between parallel walls, lugs projecting from one of the walls into the space, hooks extending from each section to enter the space and engage the lugs of the meeting section, and a spring stop on each section arranged to yield to pressure of a hook belonging to the meeting section when both sections are joined and to automatically return to normal position after the hook has been engaged with a lug.

2. A tubular-coupling comprising two sections each of which is provided with an annular space, lugs extending into the space, projecting hooks that engage with the lugs of the meeting-section, a transversely shouldered longitudinal sliding plate having a lateral lug, a spiral-spring opposing the lug, and a screw-plug opposing the spring.

In testimony that I claim the foregoing I have hereunto set my hand, at Milwaukee, in the county of Milwaukee and State of Wisconsin, in the presence of two witnesses.

WARD E. HEDGER.

Witnesses:
N. E. OLIPHANT,
HENRY DANKERT.